(12) United States Patent
Gupta et al.

(10) Patent No.: US 8,331,303 B2
(45) Date of Patent: Dec. 11, 2012

(54) ADAPTIVE WIRELESS NETWORK

(75) Inventors: Anil Gupta, Shrewsbury, MA (US);
Sung-Ju Lee, San Francisco, CA (US);
Vincent Ma, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 12/896,397

(22) Filed: Oct. 1, 2010

(65) Prior Publication Data

US 2011/0211518 A1    Sep. 1, 2011

Related U.S. Application Data

(66) Substitute for application No. 61/308,770, filed on Feb. 26, 2010.

(51) Int. Cl.
*H04W 4/00* (2009.01)
*H04H 20/71* (2008.01)

(52) U.S. Cl. ........................... 370/329; 370/312

(58) Field of Classification Search ............... 370/312, 370/329
See application file for complete search history.

(56) References Cited

U.S. PATENT DOCUMENTS

| | | | |
|---|---|---|---|
| 5,995,512 A * | 11/1999 | Pogue, Jr. | 370/419 |
| 7,505,447 B2 | 3/2009 | Kish et al. | |
| 7,787,436 B2 * | 8/2010 | Kish et al. | 370/349 |
| 2007/0183310 A1* | 8/2007 | Nakamura | 370/208 |
| 2009/0016263 A1* | 1/2009 | Kishigami et al. | 370/328 |

* cited by examiner

*Primary Examiner* — Kenny Lin

(57) ABSTRACT

Systems, methods, and devices are provided for an adaptive wireless network. A wireless network device for an adaptive wireless network can include an application specific integrated circuit (ASIC) including logic and memory resources coupled to the ASIC. The logic can store information received from a number of clients associated with the wireless network device regarding capabilities of the number of clients in the memory resources. The logic can adapt a guard interval and/or a channel width for transmission of a data stream according to capabilities of a number of clients associated with the wireless network device.

15 Claims, 4 Drawing Sheets

ADAPTIVE WIRELESS NETWORK

This application claims priority to U.S. Provisional Application 61/308,770 filed Feb. 26, 2010, the specification of which is incorporated herein by reference.

BACKGROUND

Computing networks can include multiple devices including network devices such as routers, switches, and hubs, computing devices such as servers, desktop PCs, laptops, workstations, and peripheral devices, e.g., printers, facsimile devices, and scanners, networked together across a local area network (LAN), a wireless local area network (WLAN), and/or wide area network (WAN).

One application for WLANs is for streaming data, such as streaming movies, music, or other media. In some instances, multiple computing devices, e.g., clients, may be associated with a single network device, e.g., access point (AP). The client computing devices may include a network device such as a wireless network card to facilitate communication with the AP. The data throughput of the AP for a data stream from the AP to the clients may be limited by the abilities of any one of the multiple clients. For example, if five clients are associated with the AP and four of the clients are capable of receiving data at a "fast" maximum speed but one of the clients is capable of receiving data at a "slow" maximum speed, then the AP may be configured to multicast and/or broadcast for the five clients at the "slow" speed to ensure that all five clients receive the data stream. Conversely, if the AP is configured to multicast and/or broadcast at the "fast" speed, the one client may not receive the transmission. Transmission characteristics of the AP may generally be parameters configurable by a network administrator.

Some previous approaches to WLAN multicast and/or broadcast data streams include provisioning of an AP by a network administrator to select the "slowest" maximum speed for any client expected to receive the data stream as described above. Other approaches have included the use of multicast and/or broadcast to unicast conversion for all clients such that the speed of each converted unicast data stream can be tailored to each client's abilities. Such unicast approaches can exhaust the resources of the AP without serving all clients that wish to receive the data stream. Accordingly, such previous unicast approaches may include the use of admission control by blocking data streams to new clients when a data transmission capacity of the AP is reached by current clients.

DETAILED DESCRIPTION

Figure 1:
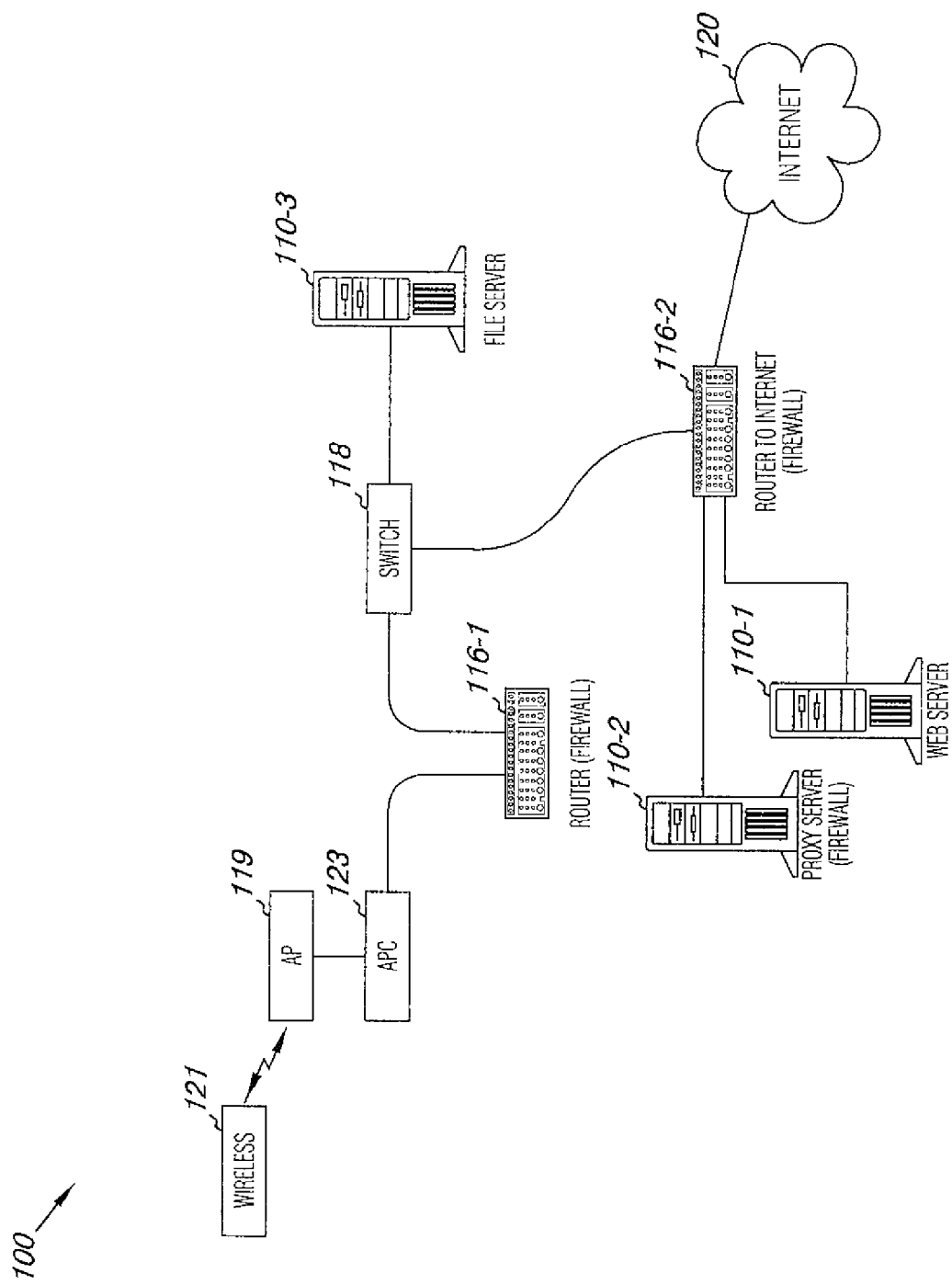
FIG. 1 illustrates an example of a computing device network.

Embodiments of the present disclosure may include devices, systems, and methods, including executable instructions and/or logic. In one embodiment of the present disclosure, adaptive channel width and/or adaptive guard interval can be used for high throughput multicast and/or broadcast data streams in a wireless network.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," and "W," particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 119 may reference element "19" in FIG. 1, and a similar element may be referenced as 219 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a computing device network 100. As shown in FIG. 1, a number devices can be networked together in a LAN and/or WAN via routers, hubs, switches, and the like. As used herein a "network device" means a switch, router, hub, bridge, access point, etc., e.g., a network infrastructure device having processor and memory resources and connected to a network 100. Although the term switch will often be used herein, examples may be implemented with other network devices. The term "client" can be used to refer to servers, PCs, etc., as illustrated further below.

The example network of FIG. 1 illustrates a web server 110-1, a proxy server (firewall) 110-2, and a file server 110-3. The file server 110-3 for example, may store media to be streamed to one or more wireless devices 121 by the access point (AP) 119. Logic associated with the AP 119 can adapt at least one of a guard interval and a channel width for transmission of a data stream according to the capabilities of the number of wireless clients 121 associated with the AP 119. In some examples, the logic of the AP 119 can calculate a total efficiency for transmission of the data stream to the number of wireless clients 121 by a plurality of transmission schemes and select one of the plurality of transmission schemes that provides the greatest total efficiency. The examples described here do not provide an exhaustive list of servers that may be used in a network.

The example of FIG. 1 illustrates that a number of example devices can be connected to one another and/or to other networks using routers, 116-1 and 116-2 and hubs and/or switches 118, among others. As noted above, such devices can include a processor in communication with a memory and may include network chips having hardware logic, e.g., in the form of application specific integrated circuits (ASICs), associated with the number of network ports. The term "network" as used herein is not limited to the number, type, and/or configuration of devices illustrated in FIG. 1.

A number of wireless devices 121, e.g., mobile devices, can connect to the network 100 via a wireless air interface (e.g., 802.11) which can provide a signal link between the wireless device 121 and the AP 119. The AP 119 serves a similar role to the base station in a cellular network. As shown in FIG. 1, the AP 119 can be managed by an access point controller (APC) 123, which provides management and configuration information to the AP 119 over a packet switched signal link, e.g. an Ethernet link.

A device in the network 100 can be physically associated with a port of a switch to which it is connected. Information in the form of packets can be passed through the network 100. Users physically connect to the network through ports on the network 100. Data frames, or packets, can be transferred between devices by way of a device's, e.g., switch's, logic link control (LLC)/media access control (MAC) circuitry, or "engines", as associated with ports on a device. A network switch forwards packets received from a transmitting device to a destination device based on the header information in received packets. A device can also forward packets from a given network to other networks through ports on other devices. An Ethernet network is described herein. However, examples are not limited to use in an Ethernet network, and may be equally well suited to other network types, e.g., asynchronous transfer mode (ATM) networks, etc.

As used herein, a network can provide a communication system that links two or more computers and peripheral devices, allows users to access resources on other computers, and exchange messages with other users. A network allows users to share resources on their own systems with other network users and to access information on centrally located systems or systems that are located at remote offices. It may provide connections to the Internet 120 or to the networks of other organizations. Users may interact with network-enabled machine readable instruction, e.g., software and/or firmware, applications to make a network request, such as to get a file or print on a network printer. Applications may also communicate with network management machine readable instructions, which can interact with network hardware to transmit information between devices on the network.

Figure 2A:
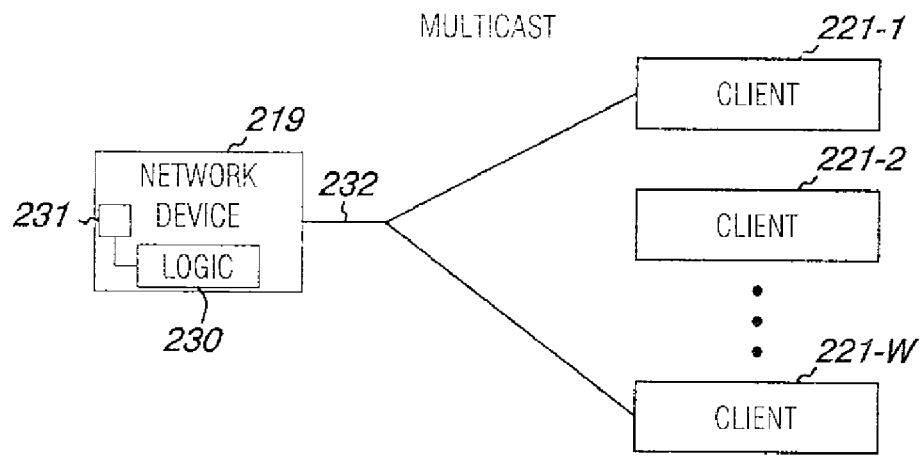
FIGS. 2A-2C are block diagrams illustrating a portion of a network, such as shown in FIG. 1, having devices suited to implement embodiments of the present disclosure.
Figure 2B:
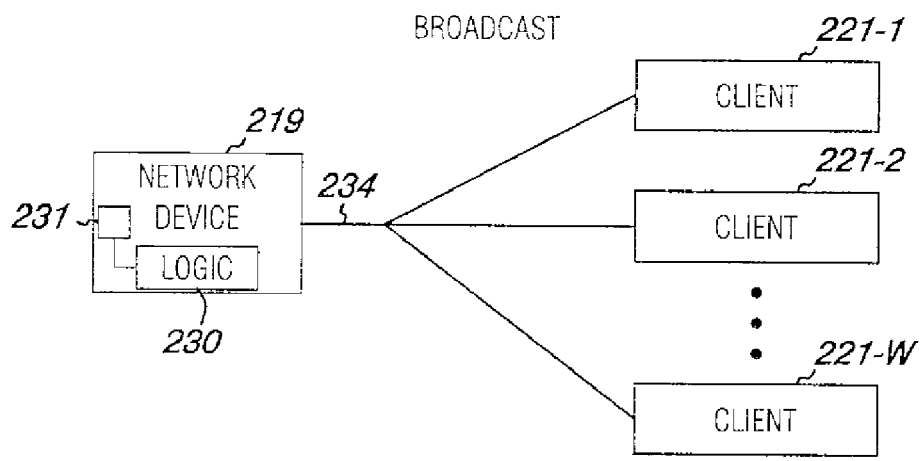
Figure 2C:
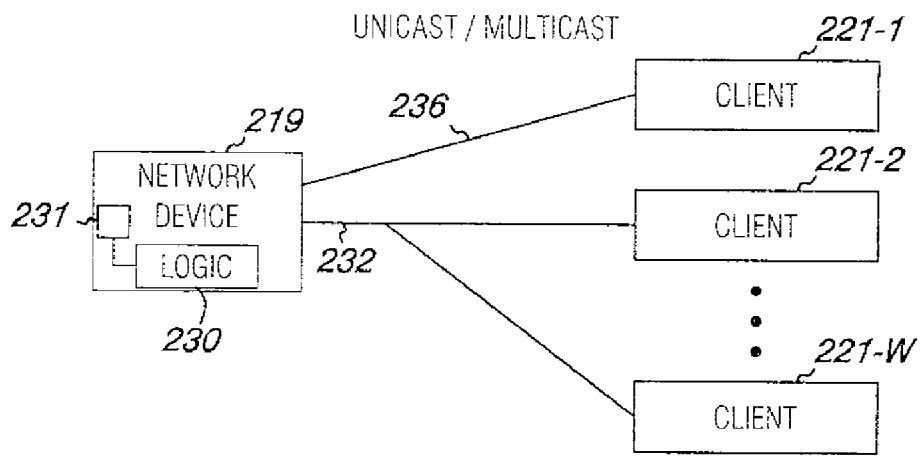

FIGS. 2A-2C are block diagrams illustrating a portion of a network, such as shown in FIG. 1, having devices suited to implement embodiments of the present disclosure. In particular, FIGS. 2A-2C illustrate an access point (AP) 219. The AP 219 can include processor resources (not specifically illustrated) and memory resources 231 for executing instructions stored in a tangible non-transitory medium and/or an application specific integrated circuit (ASIC) including logic 230 configured to perform various examples of the present disclosure. As used herein, processor resources can include one or a plurality of processors such as in a parallel processing system. Memory resources 231 can include memory addressable by the processor resources for execution of machine readable instructions. The memory resources can include volatile and/or non-volatile memory such as random access memory (RAM), static random access memory (SRAM), electronically erasable programmable read-only memory (EEPROM), magnetic memory such as a hard disk, floppy disk, and/or tape memory, a solid state drive (SSD), flash memory, phase change memory, etc.

FIGS. 2A-2C also include a number of clients 221-1, 221-2, . . . , 221-W associated with the AP. A potential client can associate with the AP 219 by connecting to, e.g., "handshaking" with, the AP 219. The particular client 221-1 and the AP 219 can perform a handshaking operation such that the particular client 221-1 transmits data to the AP 219 including information regarding abilities of the particular client 221-1. The AP 219 can maintain information regarding each client 221-1, 221-2, . . . , 221-W associated with the AP 219, e.g., in a table stored in memory resources 231 of the AP 219.

Clients 221-1, 221-2, . . . , 221-W can include network devices associated with computing devices. For example client 221-1 can include a wireless network card associated with a laptop computing device, however examples are not so limited. An AP 219 can transmit data within a communication boundary, e.g., a physical area in which transmissions from the AP 219 can reliably be received. Although FIGS. 2A-2C illustrate devices 219 having an ASIC including logic 230, devices 219 can alternatively or additionally include processor and memory resources 231. Although FIGS. 2A-2C illustrate clients 221-1, 221-2, . . . , 221-W associated with the AP 219 within a communication boundary of the AP 219, other potential clients can exist within the communication boundary of the AP 219. In some examples, the portion of the network illustrated in FIGS. 2A-2C can use the IEEE 802.11n standard. Embodiments are not limited to devices employing wireless connectivity.

The present disclosure includes a discussion of multicasting and broadcasting via an AP 219. One application for WLANs is for streaming data, such as streaming movies, music, or other media. A number of WLAN clients 221-1, 221-2, . . . , 221-W may be associated with a particular AP 219. A multicast data stream 232 from an AP 219 may include streaming at least one data packet from the AP 219 to some, but not all, of the clients 221-1, 221-2, . . . , 221-W associated with the AP 219. That is, the AP 219 makes one transmission of a particular packet for those clients 221-1, . . . , 221-W receiving the multicast. A broadcast data stream 234 from an AP 219 may include streaming at least one data packet from the AP 219 to all of the clients 221-1, 221-2, . . . , 221-W associated with the AP 219. That is, the AP 219 makes one transmission of a particular packet for all of the clients 221-1, 221-2, . . . , 221-W receiving the broadcast data stream 234. A unicast data stream 236 from an AP 219 may include streaming at least one data packet from the AP 219 to just one client 221-1 associated with the AP 219. That is, the AP 219 makes at least one transmission for each client 221-1 receiving the unicast data stream 236. With respect to a unicast data stream 236, if a particular transmission fails, an AP 219 may attempt to resend the transmission. For example, if five clients receive a multicast or broadcast packet transmitted from an AP 219, the AP 219 makes just one transmission of the packet. However, if the five clients receive a unicast packet from the AP 219, the AP 219 makes at least five transmissions of the packet.

For wireless applications using an AP 219, the difference between multicasting and a broadcasting can be effectively defined by the actions of the clients 221-1, 221-2, . . . , 221-W associated with the AP rather than the addressing provided by the AP 219 to the transmission of the multicast or broadcast. That is, for multicasting or broadcasting, the AP 219 can transmit a data stream that is "received" by all clients. However, in multicasting, not all of the clients may process the received data stream, e.g., some clients may drop a number of packets associated with the data stream based on security settings of the client, inability to process the data stream, user settings, or some other parameter. Conversely, in broadcasting, all clients receive and process the packets. For example, transmitting a broadcast data stream 234 can include the use a sufficiently generic address such that all clients 221-1, 221-2, . . . , 221-W associated with the AP 219 receive and process packets associated with the broadcast data stream 234, e.g., the clients 221-1, 221-2, . . . , 221-W each have an address included within the generic address. Transmitting a multicast data stream 232 can include the use of a similarly generic address such that multiple clients 221-1, . . . , 221-W receive and process packets associated with the multicast data stream 232. In some instances, the generic address of the broadcast data stream 232 and the generic address of the multicast data stream 232 may be the same generic address, however in the case of the multicast data stream, at least one of the clients 221-2 associated with the AP 219 does not receive and process the packets associated with the multicast data stream 232, e.g., due to inability or having an address not included within the generic address. Conversely, transmitting a unicast data stream 236 can include the use of a specific address such that only one client 221-1 receives and processes packets associated with the unicast data stream 236, e.g., the specific address is the address of the client 221-1. For ease of illustration and description with respect to FIGS. 2A-2C, the terms "multicast" and "broadcast" will be used.

FIG. 2A illustrates a multicast data stream 232 from the AP 219 at least to clients 221-1 and 221-W, but not to client 221-2 according to a number of examples of the present disclosure. As described herein, a multicast data stream 232 from the AP 219 can include streaming at least one data packet from the AP 219 to some, but not all, of the clients 221-1, 221-2, . . . , 221-W associated with the AP 219. Thus, as illustrated in FIG. 2A, the AP 219 can make one transmission of a particular packet that is received by both client 221-1 and client 221-W. The AP 219 can transmit a multicast data stream 232 using group addressing for those clients 221-1 and 221-W receiving the multicast data stream 232. For example, a group address can generically indicate more than one client 221-1 and 221-W and exclude other clients 221-2.

FIG. 2B illustrates a broadcast data stream 234 from the AP 219 to all clients 221-1, 221-2, . . . , 221-W according to a number of examples of the present disclosure. As described herein, a broadcast data stream 234 from the AP 219 can include streaming at least one data packet from the AP 219 to all of the clients 221-1, 221-2, . . . , 221-W associated with the AP 219. Thus, as illustrated in FIG. 2B, the AP 219 can make one transmission of a particular packet that is received by all of the clients 221-1, 221-1, . . . , 221-W. The AP 219 can transmit a broadcast data stream 234 using a broadcast address that generically indicates every client 221-1, 221-2, . . . , 221-W associated with the AP 219.

A number of examples of the present disclosure can include the use of multiple-input and multiple-output (MEMO) antennas in association with devices such as AP 219 and/or a number of clients 221-1, 221-2, . . . , 221-W. Use of MIMO antennas, e.g., two or more antennas for each of a transmitting device such as AP 219 and a receiving device such as client 221-1, can increase data throughput and a communication boundary, e.g., transmission range. In particular, spatial multiplexing can be employed to transmit separate data streams, e.g., one stream for each antenna, transferred simultaneously within one channel of bandwidth between an AP 219 and a client 221-1, 221-2, . . . , 221-W.

In some examples that use MIMO antennas, channel bonding can be used to increase throughput by transmitting a particular data stream via more than one MIMO antenna simultaneously. Such examples can effectively increase the throughput of a data stream by a factor equal to the number of MIMO antennas used. For example a system using two MIMO antennas for each of a transmitter and receiver, e.g., AP and client, can effectively double the speed of the data stream by striping the data stream across the two antennas. Furthermore, physical layer (PHY) channel width can be increased from a narrower 20 MHz channel width to a wider 40 MHz channel width between devices having the capability to support channel bonding, effectively doubling the throughput of a data stream. Thus, logic on a device can use adaptive channel bonding to increase throughput. Examples of the present disclosure are not limited to the particular values given herein. Thus, for example, although 20 MHz and 40 MHz are used as examples of channel widths herein, the present disclosure is not limited to these specific values.

Examples of the present disclosure can provide an adaptive guard interval. Conventional devices may operate at either a long guard interval, e.g., 800 ns, or a short guard interval (SGI), e.g., 400 ns. For example, if a particular network included a client that was not capable of supporting SGI, then an AP for that network may generally be configured to transmit using a long guard interval, even if the AP itself was capable of transmitting with an SGI. However, according to the present disclosure, an AP 219 can adapt a guard interval associated with transmission of a data stream to comply with the guard intervals of clients that are receiving a particular data stream. In some examples, the AP 219 can be configured to transmit a data stream, e.g., multicast and/or broadcast, using the shortest common guard interval of those devices that are receiving the data stream. That is, the AP 219 can adapt its guard interval according to the clients that will receive the data stream. Thus, if the network associated with the AP 219 includes both SGI and long guard interval devices, the AP 219 would not always be restricted to operating with the long guard interval. Accordingly, if all clients receiving the data stream are capable of supporting a short guard interval (SGI), then the AP 219 can transmit the data stream using the SGI. However, if any one of the clients receiving the data stream cannot support SGI, then the AP 219 should transmit the data stream using a long guard interval. A guard interval can be included at the beginning and/or end of a particular portion of a transmission to help prevent different transmissions from interfering with each other, e.g., by propagation delays, echoes, reflections, etc. Examples of the present disclosure are not limited to the particular values given herein. Thus, for example, although 800 ns and 400 ns are used as examples of guard intervals herein, the present disclosure is not limited to these specific values.

Examples of the present disclosure can provide an adaptive channel width. Conventional devices may be configured operate at a particular channel width, e.g., 20 MHz or 40 MHz. For example, if a particular network included a client that was not capable of supporting a 40 MHz channel width, then an AP for that network would generally be configured to transmit using a 20 MHz channel, even the AP itself was capable of transmitting at 40 MHz. However, according to the present disclosure, an AP 219 can adapt a channel width associated with transmission of a data stream to comply with the channel widths of clients that are receiving a particular data stream. In some examples, the AP 219 can be configured to transmit a data stream, e.g., multicast and/or broadcast, using the widest common channel width of those devices that are receiving the data stream. That is, the AP 219 can adapt its channel width according to the clients that will receive the data stream. Thus, if the network associated with the AP 219 includes both 20 MHz and 40 MHz devices, the AP 219 would not always be restricted to operating at 20 MHz. Accordingly, if all clients receiving the data stream are capable of supporting a 40 MHz channel width, then the AP 219 can transmit the data stream using a 40 MHz channel width. However, if any one of the clients receiving the data stream cannot support a 40 MHz channel width, then the AP 219 can transmit the data stream using a 20 MHz channel width. For example, the AP 219 should use the 40 MHz channel for multicast transmissions when channel bonding is enabled on all clients receiving the multicast transmission.

In response to a particular client, e.g., client 221-1, associating with an AP 219, the particular client 221-1 and the AP 219 can "handshake" such that the particular client 221-1 transmits data to the AP 219 including information regarding abilities of the particular client 221-1. The AP 219 can maintain information regarding each client 221-1, 221-2, ..., 221-W associated with the AP 219, e.g., in a table stored in memory resources 231 of the AP 219. The AP 219 can use this information to transmit a data stream using an adaptive guard interval and/or an adaptive channel width as described herein. For example, for a particular data stream, the AP 219 can transmit a data stream, e.g., a multicast data stream 232 and/or a broadcast data stream 234, using SGI and/or a 40 MHz channel width when the information maintained in the memory resources 231 of the AP 219 regarding the abilities of the clients receiving the transmission indicates that all of the clients receiving the transmission are able to receive transmission using SGI and/or a 40 MHz channel width. As another example, when the information maintained in the memory resources 231 of the AP 219 indicates that any of the clients receiving the transmission are not capable of receiving the transmission using SGI and/or a 40 MHz channel width, then the AP 219 can adapt the guard interval and/or channel width accordingly.

The AP 219 can provide more than one WLAN, e.g., service set. The AP 219 can have more than one service set identifier (SSID) associated therewith. Each SSID can represent a distinct WLAN provided by the single AP 219. Each WLAN provided by the AP 219 can have a distinct set of clients associated therewith. However, all clients associated with any of the WLANs provided by the AP 219 may be within the physical communication boundary provided by the AP 219. A potential client within the communication boundary, e.g., a client not associated with any WLAN provided by the AP 219, can become associated with any one of the multiple WLANs by "handshaking" with the AP 219 as described herein.

For example, one concourse in an airport can host a number of airlines, e.g, five airlines, operating gates in the concourse. The concourse can be provided with a single AP having five SSIDs to provide a distinct WLAN for each airline in the concourse. A customer of a first airline can receive a data stream, e.g., using a mobile computing device, from the AP by connecting to a first WLAN having a first SSID associated with the first airline, while a customer of a second airline can receive a data stream from the AP by connecting to a second WLAN having a second SSID associated with the second airline, and so on.

According to a number of examples of the present disclosure that include an AP 219 providing more than one WLAN, the AP 219 can provide adaptive channel width and/or adaptive guard interval, as described herein, for each WLAN separately. Thus, for example, a first WLAN provided by the AP 219 can include a first number of associated clients and a second WLAN provided by the AP 219 can include a second number of associated clients. The AP 219 can transmit a data stream to the first number of clients via the first WLAN using an adaptive channel width and/or and adaptive guard interval based on the capabilities of the first number of clients, e.g., as identified in the memory resources 231 of the AP 219. Likewise, the AP 219 can transmit a data stream to the second number of clients via the second WLAN using an adaptive channel width and/or an adaptive guard interval based on the capabilities of the second number of clients, e.g., as identified in the memory resources 231 of the AP 219.

Multicasting data via a WLAN can have a number of applications. For example, movies can be streamed inside the cabin of a commercial airplane. In such an example application, an AP may be configured to multicast a number of data streams, e.g., movies, to clients, e.g., video screens having a wireless device to receive the multicast from the AP. Those passengers who wish to view a particular movie can connect their wireless client device, e.g., a screen built into the back of the chair in front of the passenger, or the passenger's portable computing device, etc., to the AP, select a data stream associated with the movie, and start receiving the data stream, e.g., start watching the movie. Another example application includes digital signage. For example, in a retail environment, an AP may be configured to multicast a number of data streams, e.g., product advertisements, to clients, e.g., digital signs having a wireless device to receive the multicast from the AP. A number of the clients, e.g., digital sign, may receive a number of different product advertisements.

For any of a number of such example applications, logic associated with the AP can adapt at least one of a guard interval and a channel width for transmission of a data stream according to the capabilities of those clients associated with the AP. Thus, the AP can transmit the data stream efficiently for a given set of clients, e.g., the AP can adapt transmission characteristics to improve throughput of the transmission according to the capabilities of the clients associated with the AP, without excluding those clients not having an ability to receive a higher throughput transmission. For example, the AP can transmit using at least one of SGI and/or a wider channel width when the same is supported by clients associated with the AP, or the AP can transmit without SGI and/or the wider channel width when the same is not supported by the clients, as opposed to some previous approaches that include fixing the capabilities of the AP at a particular performance threshold.

FIG. 2C illustrates a unicast data stream 236 from the AP 219 to client 221-1 and a multicast data stream 232 to clients 222-2, ..., 221-W according to a number of examples of the present disclosure. As described herein, a unicast data stream 236 from the AP 219 can include streaming at least one data packet from the AP 219 to just one client 221-1 associated with the AP 219. Thus, as illustrated in FIG. 2C, the AP 219 can make a first transmission of a particular packet to a client 221-1 receiving a unicast data stream 236 from the AP 219 and a second transmission of the particular packet to clients 221-2, ..., 221-W receiving a multicast data stream 232 and/or a broadcast data stream 234 from the AP 219. The AP 219 can transmit a unicast data stream 236 to a particular client 221-1 using a unicast address that specifically indicates the particular client 221-1.

Figure 3:
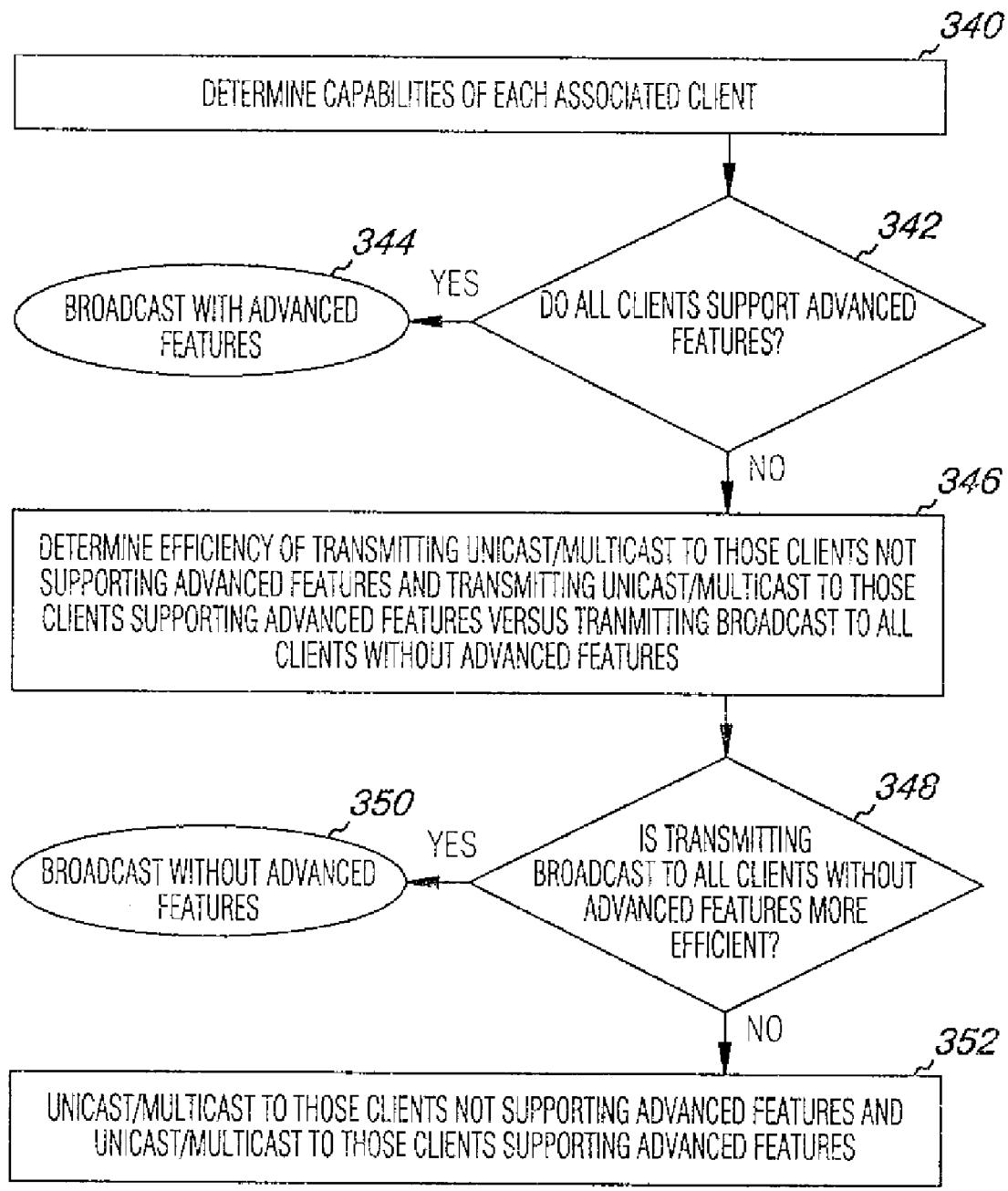
FIG. 3 provides a flow chart illustrating an example of a method for efficiently transmitting data in an adaptive wireless network.

FIG. 3 provides a flow chart illustrating an example of a method for efficiently transmitting data in an adaptive wireless network. At step 340, the AP can determine the capabilities of each client associated with the AP, e.g., as a result of a handshaking operation in which the AP receives data including information regarding the abilities of each client. Logic in the AP can be configured to make a determination as to whether all of the clients support advanced features at step 342. If all clients support advanced features, e.g., SGI and wide channel width, then logic in the AP can be configured to broadcast a data stream to all clients with advanced features, at step 344, e.g., the AP can broadcast using SGI and wide channel width.

If all clients associated with the AP do not support advanced features, then, in a number of examples of the present disclosure, logic in the AP can be configured to determine, e.g., calculate, a total efficiency of transmitting a data stream to clients by a variety of transmission schemes, e.g., transmitting unicast or multicast to those clients not supporting advanced features and transmitting unicast or multicast to those clients supporting advanced features versus transmitting broadcast to all clients without using advanced features, at step 346. As between unicast or multicast above, a determination can be made by logic of the AP dependent upon the number of clients not supporting advanced features such that unicast can be used for a single client and multicast can be used for multiple clients. In some examples, multicast can be used regardless of the number of clients, e.g., where a generic group address can be used with the transmission and where only the one client has an address within the generic group address.

For example, a first client can support long guard interval and a 20 MHz channel width, but not support SGI or 40 MHz channel width. Second and third clients can support both long guard interval and SGI as well as both 20 MHz and 40 MHz channel widths. For instances in which all clients are to receive a data stream, the AP can calculate an efficiency of broadcasting the data stream using long guard interval and a 20 MHz channel width to all of the three clients, transmitting a unicast data stream to each of the three clients individually according to the each client's capabilities, or of transmitting a multicast data stream to the second and third clients using SGI and a 40 MHz channel width while transmitting a unicast data stream to client using a long guard interval and a 20 MHz channel width. In some examples, the AP can select the transmission scheme that provides the greatest total efficiency of transmission. The efficiency of the transmission scheme can be calculated according to total data throughput of the AP, number of clients receiving the transmitted data stream from the AP, average data throughput of the AP over a period of time per client receiving the data stream, and/or another efficiency metric. The AP can adapt the guard interval and channel width of the transmission according to the capabilities of the clients and the selected transmission scheme.

Logic in the AP can make a determination as to whether transmitting a broadcast to all clients without using advanced features is more efficient than transmitting at least two different transmissions, e.g., transmit unicast/multicast to those clients not supporting advanced features and transmit unicast/multicast to those clients supporting advanced features, as illustrated at 348. If the broadcast to all clients without using advanced features is more efficient, then logic in the AP can be configured to transmit the data stream accordingly, at step 350. If such a broadcast is not more efficient, then logic in the AP can be configured to transmit unicast/multicast to those clients not supporting advanced features and transmit unicast/multicast to those clients supporting advanced features, at step 352.

Figure 4:
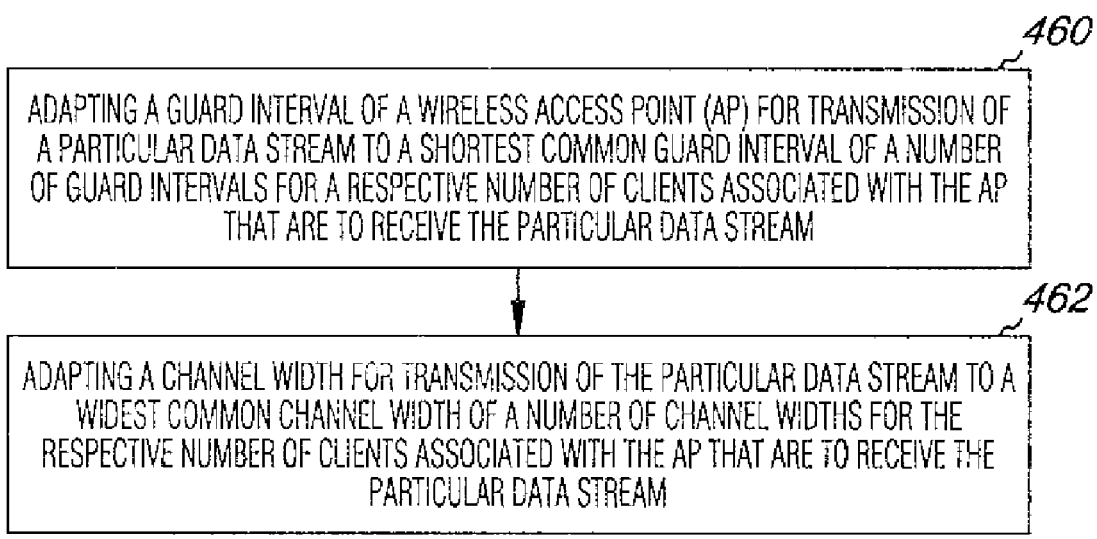
FIG. 4 provides a flow chart illustrating an example of a method for an adaptive wireless network.

FIG. 4 provides a flow chart illustrating an example of a method for an adaptive wireless network. At step 460, the method includes adapting a guard interval of a wireless access point (AP) for transmission of a particular data stream to a shortest common guard interval of a number of guard intervals for a respective number of clients associated with the AP that are to receive the particular data stream. At step 462, the method also includes adapting a channel width for transmission of the particular data stream to a widest common channel width of a number of channel widths for the respective number of clients associated with the AP that are to receive the particular data stream.

It is to be understood that the above description has been made in an illustrative fashion, and not a restrictive one. Although specific examples have been illustrated and described herein, other component arrangements and device logic can be substituted for the specific examples shown. Accordingly, the present disclosure is not limited to the use of more than one spatial stream. The present disclosure is not limited to the use of more than one antenna for a particular device.

What is claimed:

1. A wireless network device for an adaptive wireless network, the wireless network device comprising:
   an application specific integrated circuit (ASIC) including logic; and
   memory resources coupled to the ASIC;
   wherein the logic stores information received from a number of clients associated with the wireless network device regarding capabilities of the number of clients in the memory resources; and
   wherein the logic adapts at least one of a guard interval and a channel width for transmission of a data stream according to the capabilities of the number of clients.

2. The wireless network device of claim 1, wherein the logic uses adaptive channel bonding to increase throughput; and
   wherein the transmission includes a multicast data stream.

3. The wireless network device of claim 1, wherein the logic calculates a total efficiency for transmission of the data stream to the number of clients by a plurality of transmission schemes and selects one of the plurality of transmission schemes that provides the greatest total efficiency.

4. The wireless network device of claim 1, wherein the logic adapts the guard interval from a long guard interval to a short guard interval to increase throughput in response to the information received from the number of clients indicating that the capabilities of the number of clients include an ability to receive short guard interval transmissions.

5. The wireless network device of claim 1, wherein the wireless network device includes a plurality of service set identifiers (SSIDs) associated therewith;
   wherein each of the number of clients is associated with one of the plurality of SSIDs; and
   wherein the logic adapts at least one of the guard interval and the channel width for transmission of a data stream for each of the plurality of SSIDs separately.

6. The wireless network device of claim 1, wherein the logic:
   adapts the guard interval to a shortest common guard interval of a number of guard interval capabilities of the number of clients; and
   adapts the channel width to a widest common channel width of a number of channel width capabilities of the number of clients.

7. A set of instructions for an adaptive wireless network, the instructions fixed in a tangible, machine readable medium, which when executed by a processor cause a wireless access point (AP) to:
   adapt a guard interval of the AP for transmission of a particular data stream to a shortest common guard interval of a number of guard intervals for a respective number of clients associated with the AP that are to receive the particular data stream; and
   adapt a channel width for transmission of the particular data stream to a widest common channel width of a number of channel widths for the respective number of clients associated with the AP that are to receive the particular data stream.

8. A wireless network device implemented method for an adaptive wireless network, the method comprising:
   adapting a guard interval of a wireless access point (AP) for transmission of a particular data stream to a shortest common guard interval of a number of guard intervals for a respective number of clients associated with the AP that are to receive the particular data stream; and adapting a channel width for transmission of the particular data stream to a widest common channel width of a number of channel widths for the respective number of clients associated with the AP that are to receive the particular data stream.

9. The method of claim 8, wherein the method includes:

receiving information regarding the number of guard intervals and the number of channel widths of the respective number of clients associated with the AP; and storing the information in memory resources of the AP.

10. The method of claim 9, wherein the method includes transmitting the particular data stream using a short guard interval (SGI) in response to the information indicating that all of the respective number of clients are able to receive the transmission using SGI.

11. The method of claim 9, wherein the method includes transmitting the particular data stream using a 40 MHz channel width in response to the information indicating that all of the respective number of clients are able to receive the transmission using the 40 MHz channel width.

12. The method of claim 8, wherein the method includes:

providing a first wireless local area network (WLAN) for the respective number of clients associated with the AP;

providing a second WLAN for a different number of clients associated with the AP that are to receive a different data stream; and adapting a guard interval of the AP for transmission of the different data stream to a shortest common guard interval of a number of guard intervals for the different number of clients; and adapting a channel width for transmission of the different data stream to a widest common channel width of a number of channel widths for the different number of clients;

wherein at least one of the guard interval and the channel width for transmission of the different data stream are different than the guard interval and the channel width for transmission of the particular data stream.

13. The method of claim 8, wherein the method includes calculating an efficiency of transmitting the particular data stream to the respective number of clients using a variety of transmission schemes.

14. The method of claim 13, wherein the variety of transmission schemes include:

broadcasting to all of the respective number of clients using a common guard interval and a common channel width; and multicasting to a portion of the respective number of clients using a common guard interval and a common channel width and unicasting to a remainder of the respective number of clients using at least one of a guard interval different than the common guard interval and a channel width different than the common channel width.

15. The method of claim 13, wherein the method includes:

selecting one of the variety of transmission schemes having a greatest total calculated efficiency;

calculating the efficiency according to at least one of:

total data throughput of the respective number of clients; and average data throughput of the AP over a period of time per the respective number of clients; and adapting the guard interval and channel width of the transmission according to the selected one of the variety of transmission schemes.

\* \* \* \* \*